United States Patent Office
3,483,274
Patented Dec. 9, 1969

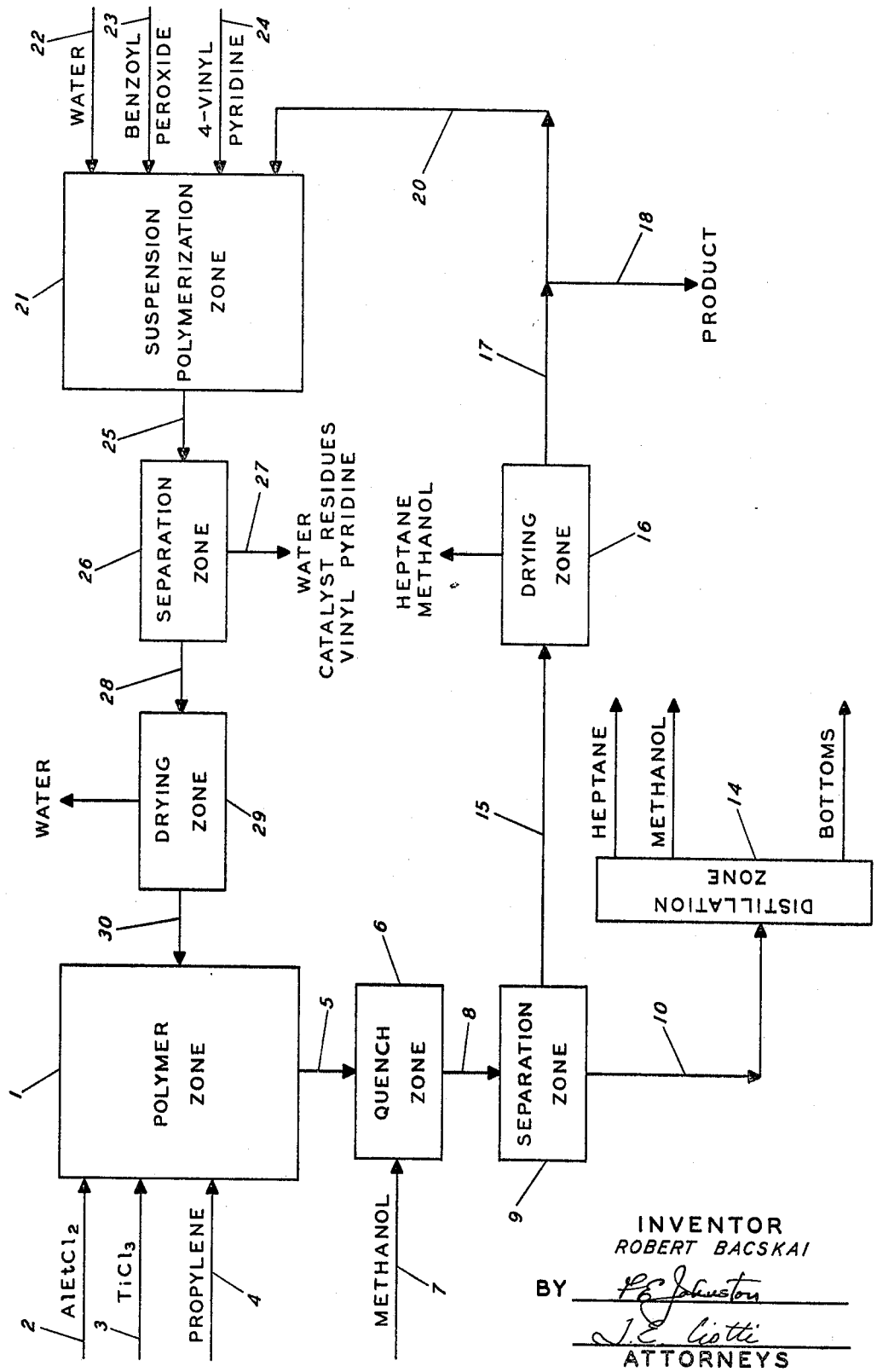

3,483,274
STEREOREGULAR COORDINATION CATALYST SYSTEM HAVING NITROGEN-CONTAINING POLYMERS
Robert Bacskai, Berkeley, Calif., assignor to Chevron Research Company, San Francisco, Calif., a corporation of Delaware
Filed Nov. 17, 1966, Ser. No. 595,058
Int. Cl. C08f 1/56; B01j 11/84
U.S. Cl. 260—878
8 Claims

ABSTRACT OF THE DISCLOSURE

Coordination catalyst comprising titanium trihalide, alkylaluminum halide and polymer containing nitrogen in the form of tertiary amine.

---

This invention concerns a unique coordination catalyst comprising titanium trihalide, an alkylaluminum halide and a polymer containing nitrogen in the form of a tertiary amine and improved methods for polymerizing hydrocarbon mono-α-olefins using this catalyst.

Alkylaluminum halides in the presence of titanium trihalides are known catalysts for polymerizing mono-α-olefins to stereoregular polymers. Adjuvants, such as monomeric amines (pyridine, alkylamines, etc.) have been used to increase the activity of these catalysts. In general as the concentration of such amine adjuvants is increased, the activity of the catalyst increases. But at high amine concentrations relative to the catalyst concentration the catalyst's activity falls off drastically resulting in a very low polymer yield and very little stereoregular polymer.

It has now been found that the catalytic activity of catalysts comprising titanium trihalide and alkylaluminum halide may be significantly enhanced by adding a polymer of an addition-polymerizable monomer containing nitrogen in the form of a tertiary amine. At comparable amounts, the adjuvent properties of the nitrogen-containing polymer are better than the adjuvant properties of the low molecular weight amines, such as pyridine. Unlike the low molecular weight amines, the effectiveness provided by the polymeric amine does not fall off at higher nitrogen to catalyst concentrations. Instead, its effectiveness continues to increase at concentrations where the low molecular weight amines would already have deactivated the catalyst. The unexpectedness of this result is even more surprising since the polymeric amines of this invention are insoluble in the polymerization medium. In contrast, the previously used adjuvants were soluble in the polymerization medium.

The coordination catalysts with which these unique nitrogen-containing polymers may be used comprise titanium trihalide wherein the halogens are of atomic number 17 to 35, i.e., chlorine and bromine, and an alkylaluminum halide in which the ratio of aluminum to halogen is in the range of 1:1 and 1:2, the alkyl groups each contain 1 to about 6 carbon atoms and the halogen is of atomic number 17 to 35. Preferably, the titanium trihalide is titanium trichloride, the alkyl groups of the alkyl aluminum halide are ethyl and the halogen of the alkylaluminum halide is chlorine.

Examples of alkylaluminum halides having the above description are dimethylaluminum chloride, diethylaluminum chloride, dipropylaluminum bromide, dibutylaluminum chloride, diamylaluminum bromide, ethylaluminum sesquichloride, ethylaluminum sesquibromide, butylaluminum sesquichloride, ethylaluminum dichloride, propylaluminum dibromide and the like.

The titanium trihalide may be activated or unactivated. Methods for preparing activated titanium trihalide are known in the art. For instance, titanium tetrahalide may be reduced with aluminum to form a titanium trihalide-aluminum trihalide mixture in a 3 to 1 mol ratio. Activated titanium trihalide is preferred.

The nitrogen-containing polymer of the catalysts of this invention is a polymer of an addition-polymerizable monomer containing nitrogen as tertiary amine. The polymer may be a homopolymer, or a graft copolymer of the addition-polymerizable monomer and a polymono-α-olefin having 3 to 6 carbon atoms or mixtures of graft copolymer and homopolymer. The graft copolymers may be made by reacting the nitrogen-containing addition polymerizable monomer with the poly-α-olefin in the presence of a free radical initiator. Examples of polymers which may be used in this inventon are poly-2-vinylpyridine, poly-3-vinylpyridine, poly-4-vinylpyridine, poly-2-diethylaminoethyl acrylate, 2-vinylpyridine/polypropylene copolymer, 4-vinylpyridine/polypropylene copolymer, 3-vinylpyridine/poly-1-butene copolymer, 2-vinylpyridine/poly-4-methyl-1-pentene copolymer and the like. Preferred polymers are homopolymers of vinylpyridine and vinylpyridine/polypropylene copolymers.

These nitrogen-containing polymers are solids and have molecular weights of 10,000 and higher. Usually the polymer will have a molecular weight in the range of about 25,000 to 1,000,000.

The hydrocarbon mono-α-olefin which may be polymerized with the unique catalysts of this invention are those containing 3 to 6 carbon atoms. Examples of such mono-α-olefins are propylene, 1-butene, 1-pentene, 3-methyl-1-butene, 4-methyl-1-pentene, 1-hexene and the like.

The mono-α-olefin polymerization may be carried out at temperatures in the range of about 30 to 100° C., preferably in the range of 50 to 70° C. When the mono-α-olefin monomer is a gas, the pressure may vary from 10 to 2,000 p.s.i.; more usually it will be in the range of about 10 to 200 p.s.i. When the monomer is a liquid, such as 4-methyl-1-pentene, the concentration of monomer will usually be in the range of about 5% to 50% by weight of the reaction medium. The reaction will usually be carried out in the presence of an inert hydrocarbon solvent. Aliphatic or aromatic solvents may be used. Aliphatic hydrocarbons having 5 to 10 carbon atoms such as pentane, hexane, heptane and octane are preferred. The time for the polymerization will generally be at least about one-half hour and will rarely exceed 24 hours. In general the time is not critical and will usually be in the range of about 1 to 6 hours.

The mol ratio of alkylaluminum halide to titanium trihalide in the coordination catalyst will usually be in the range of 1:1 to 10:1, preferably 2:1 to 4:1. Normally about 0.1 to 10 mols of titanium trihalide per 100 liters of solvent, preferably 0.5 to 2 mols of titanium halide per 100 liters of solvent will be used in the reaction. The nitrogen-containing polymer will be used in amounts such that the mol ratio of nitrogen in the polymer to titanium is in the range of about 0.5:1 to 10:1.

The following examples illustrate the catalyst and methods of this invention. These examples are offered by way of illustration and are not meant to limit the invention as described herein. Unless otherwise indicated percentages are by weight.

EXAMPLE 1

200 ml. n-heptane, 2 mM. activated titanium trichloride, 4 mM. diethylaluminum chloride and a mixture of polyvinylpyridine and a graft copolymer of 2-vinylpyridine and polypropylene (together analyzing for 2.9% nitrogen) in sufficient quantity to contain 2 mM. of polymeric nitrogen, were charged to a vessel equipped with a stirrer. The mixture was stirred at room temperature and then heated to 70° C. and pressurized to 50 p.s.i. with propylene. This temperature and pressure were held for 75 minutes. After this period, the reaction was quenched with 1000 ml. methanol. The mixture was then filtered and the powdery residue was dried under vacuum.

Propylene polymerizations using the same method were carried out with no polymer, with increased amounts of the above polymeric mixture and with pyridine in place of polymer. The results of these polymerizations are reported in Table I, below.

TABLE I

| Additive | | Polymer | | |
|---|---|---|---|---|
| Nature | Nitrogen (mM.) | Yield (grams) | Insoluble in boiling heptane, percent | Intrinsic viscosity[1] (dl./g.) |
| None | 0 | 20.36 | 91.9 | 5.1 |
| 2-vinylpyridine/polypropylene graft copolymer. | 2 | 43.4 | 85.7 | 5.8 |
| | 4 | 30.8 | 85.2 | 5.1 |
| | 6 | 31.2 | 78.7 | 4.4 |
| | 8 | 36.0 | 76.5 | 4.3 |
| Pyridine | 2 | 22.9 | 77.6 | 4.6 |
| | 4 | 14.5 | 80.3 | 5.2 |
| | 6 | 0 | | |

[1] Measured in decalin at 135° C.

EXAMPLE 2

Propylene was polymerized by the method of Example 1 except that 2 mM. ethylaluminum sesquichloride were used in place of the diethylaluminum chloride. For comparison, propylene polymerizations were carried out with no graft copolymer and with pyridine replacing the graft copolymer. The results of these polymerizations are reported in Table II.

TABLE II

| Additive | | Polymer | | |
|---|---|---|---|---|
| Nature | Nitrogen (mM.) | Yield (grams) | Insoluble in boiling heptane, percent | Intrinsic viscosity (dl./g.) |
| None | 0 | 2.03 | 90.8 | 5.2 |
| 2-vinylpyridine/polypropylene graft copolymer. | 2 | 6.8 | 92.4 | 4.7 |
| | 4 | 12.9 | 93.9 | 4.4 |
| | 6 | 14.3 | 93.6 | 4.1 |
| | 8 | 11.8 | 92.4 | 4.8 |
| | 10 | 11.0 | 90.2 | 4.4 |
| | 12 | 14.0 | 90.7 | 4.1 |
| Pyridine | 1 | 7.78 | 93.1 | 4.9 |
| | 2 | 9.93 | 93.6 | 4.1 |
| | 3 | 2.98 | 86.4 | 6.3 |
| | 4 | Trace | | |

EXAMPLE 3

A cyclic polymerization process is carried out as illustrated in the attached drawing. Referring to the drawing, the first polymerization zone 1 is a large kettle fitted with heating and cooling coils, stirring means, temperature recording means, and the necessary inlets and outlets for charging and removing materials. To this vessel there is charged 25.4 parts of aluminum ethyl dichloride in 342 parts of heptane through line 2 and 108 parts of recycle polymer through line 30. This mixture is heated for one-half hour at 70° C. and then 20 parts activated titanium trichloride contained in 6840 parts of heptane is added through line 3. The contents are stirred and heated to maintain the temperature at 70° C. while propylene gas is charged through line 4 at a total system pressure of 50 p.s.i. for two hours.

At the end of this time, the slurry is passed from the polymerization zone 1 to the quench zone 6 via line 5, where it is cooled to room temperature and mixed with 7900 parts of methanol added through line 7. Agitation is continued throughout the addition of methanol. The resulting slurry is then pumped through line 8 into the separation zone 9 wherein the polymer powder is isolated by filtration. This damp polymer is then sent via line 15 into the drying zone 16 where it is heated at 80° C. for 480 minutes at 1/3 atmosphere.

The filtrate from the above separation zone 9, 15,089.4 parts, is sent to a distillation zone 14 via line 10. In this latter zone, heptane for recycle to the polymerization zone 1 and methanol for recycle to the quench zone 6 are taken as separate overhead fractions. The bottoms, containing catalyst fragments and polyvinyl pyridine, 50.4 parts, is removed and discarded.

The dry polymer, weighing 216 parts, is divided into two portions. The major portion, weighing 118.5 parts, is removed through line 18 as product. It has a melting point of about 164° C. and contains 0.64% nitrogen in the form of a graft copolymer of propylene and 4-vinyl pyridine. The minor portion, 97.5 parts, is taken through line 20 and sent to the suspension polymerization zone 21 previously charged with 3900 parts of water via line 22 and 0.15 part of benzoyl peroxide via line 23. The slurry is well mixed, and then 13.1 parts of 4-vinyl pyridine is added through line 24. The resulting slurry is then heated to 70° C. and maintained at this temperature for two hours.

At the end of this time, the polymerization mixture is removed via line 25 to a separation zone 26 in which the polymer is separated from the water by filtration. The filtrate, consisting of water, vinylpyridine, and catalyst residues, is removed through line 27 and discarded. The polymer is taken through line 28 to the drying zone 29, wherein it is dried by heating at 80° C. for 480 minutes at 1/3 atmosphere. The dried polymer, weighing 108 parts and having a nitrogen analysis of 1.36%, is then charged to the polymerization zone 1 via line 30, thereby completing the cyclic process.

EXAMPLE 4

A polymerization bottle was charged with 5 ml. of heptane containing 1.32 ml. of 25% aluminum ethyl dichloride (2 mM.) and 1.03 grams of a propylene/4-vinyl pyridine graft copolymer which analyzed for 1.36% nitrogen (0.97 mM. of 4-vinyl pyridine). This mixture was stirred at 70° C. for one-half hour, and then there was added 0.20 gram of activated titanium trichloride (1 mM.) in 100 ml. of heptane. The bottle was then filled with propylene to a pressure of 50 p.s.i. The contents were stirred at 70° C. for two hours with the pressure of propylene maintained at a constant 50 p.s.i. The reaction mixture was cooled to room temperature, the excess propylene was vented, and 2 ml. of methanol was added to destroy the catalyst. The polymer was removed by filtration and dried overnight in an oven at 80° C. under a pressure of 250 mm. Hg. The yield was 2.16 grams of a polymer.

EXAMPLE 5

Example 4 was repeated except that no graft copolymer was included in the catalyst makeup, and 4 mM. of aluminum ethyl dichloride were used in place of 2 mM. After two hours at 70° C. under a constant propylene pressure 50 p.s.i., the reaction mixture was worked up as previously described. No polymer was found.

As shown by comparing Examples 4 and 5, the addition of a small amount of polymer containing nitrogen as a tertiary amine converts this inoperative catalyst into one that does cause propylene polymerization.

As will be evident to those skilled in the art, various modifications on this invention can be made or followed, in the light of the foregoing disclosure and discussion, without departing from the spirit or scope of the disclosure or from the scope of the following claims.

I claim:
1. Coordination catalyst for stereo-regular polymerization of mono-α-olefins of 3 to 6 carbon atoms which comprises an alkylaluminum halide wherein the ratio of aluminum to halogen is in the range of 1:1 and 1:2, the alkyl groups each contain 1 to about 6 carbon atoms and the halogen is of atomic number 17 to 35, titanium trihalide wherein the halogens are of atomic number 17 to 35 and a polymer selected from the group consisting of graft copolymers of mono-α-olefins of 3 to 6 carbon atoms with vinylpyridine, homopolymers of vinylpyridine and mixtures thereof, wherein the mol ratio of alkylaluminum halide to titanium trihalide is in the range of about 1:1 and 10:1 and the mol ratio of nitrogen in the polymer to titanium is in the range of about 0.5:1 and 10:1.

2. Catalyst of claim 1 wherein the alkyl groups are ethyl.

3. Catalyst of claim 1 wherein the halogen of the alkylaluminum halide is chlorine and the halogen of the titanium trihalide is chlorine.

4. Catalyst of claim 1 wherein the polymer is the homopolymer of vinylpyridine.

5. Catalyst of claim 1 wherein the polymer is a graft copolymer of polypropylene and vinylpyridine.

6. In the process for polymerizing mono-α-olefins of 3 to 6 carbon atoms using a coordination catalyst containing an alkylaluminum halide wherein the ratio of aluminum to halogen is in the range of 1:1 and 1:2, the alkyl groups each contain 1 to about 6 carbon atoms and the halogen is of atomic number 17 to 35 and titanium trihalide wherein the halogens are of atomic number 17 to 35 and wherein the mol ratio of alkylaluminum halide to titanium halide is in the range of 1:1 and 10:1, at a temperature in the range of about 30 to 100° C., the improvement which comprises adding a polymer selected from the group consisting of graft copolymers of mono-α-olefins of 3 to 6 carbon atoms with vinylpyridine, homopolymers of vinylpyridine and mixtures thereof in an amount such that the mol ratio of nitrogen in the polymer to titanium is in the range of about 0.5:1 and 10:1.

7. The process of claim 6 wherein the alkylaluminum halide is an ethylaluminum chloride, the titanium trihalide is titanium trichloride and the polymer is the graft copolymer of mono-α-olefin of 3 to 6 carbon atoms and vinylpyridine.

8. The process of claim 6 wherein the mono-α-olefin is propylene.

References Cited

UNITED STATES PATENTS

| | | | |
|---|---|---|---|
| 3,293,326 | 12/1966 | Vezl et al. | 260—878 |
| 3,308,108 | 3/1967 | Feldhoff et al. | 260—878 |
| 3,399,249 | 8/1968 | Hostetler | 260—878 |

MURRAY TILLMAN, Primary Examiner

JOHN T. GOOLKASIAN, Assistant Examiner

U.S. Cl. X.R.

252—429; 260—877, 88.3, 895, 93.7, 94.9